(12) United States Patent
Pillot et al.

(10) Patent No.: US 6,180,809 B1
(45) Date of Patent: Jan. 30, 2001

(54) METHOD OF PREPARING SILICON AND BORON OXYNITRIDES

(75) Inventors: Jean-Paul Pillot, Cestas; Marc Birot; Jacques Dunogues, both of Talence; Yves Laurent, Thorigne-Fouillard; Paul L'Haridon, Vern sur Seiche; Laurence Bois, Rennes, all of (FR)

(73) Assignee: L'Etat Francais, represente par le Delegue General pour l'Armement, Paris (FR)

( * ) Notice: Under 35 U.S.C. 154(b), the term of this patent shall be extended for 0 days.

(21) Appl. No.: 08/807,953

(22) Filed: Feb. 28, 1997

(30) Foreign Application Priority Data

Feb. 29, 1996 (FR) .................................................. 96 02537

(51) Int. Cl.$^7$ ...................................................... C07F 7/08
(52) U.S. Cl. ........................ 556/402; 423/277; 501/96.1; 501/96.2; 501/96.4; 501/96.5
(58) Field of Search ............................ 556/402; 423/277; 501/96.2, 96.1, 96.5, 96.4

(56) References Cited

FOREIGN PATENT DOCUMENTS

| 27 43 843 | 4/1978 | (DE) . |
| 1 180 764 | 10/1967 | (GB) . |
| 2 101 147 | 1/1983 | (GB) . |
| 193717 | 8/1967 | (SU) . |
| 90/1283 | 11/1990 | (WO) . |

OTHER PUBLICATIONS

L. Bois et al., "Characterization of a Boro–silicon Oxynitride Prepared by Thermal Nitridation of a Polyborosiloxane" *Journal of Alloys and Compounds*, vol. 232, No. 1–2, (1996), pp. 244–253.

L. Venisse et al., "Etude de la Pryolyse sous ammoniac de polyborosiloxanes. I. Obtention de la Phase $Si_5B_3O_4N_7$ a partir de polydisilaboroxane", *High Temp. Chem. Processes*,. vol., Mar. 1992, pp. 129–138.

L. Venisse et al., "Pyrolysis Study of Polyborosiloxanes Under Ammonia. II. Synthesis of New $SiBO_xN_y$ Phases from Polymethyl–and Polyphenylborosiloxanes", *High Temp. Chem. Processes*, 1 (1992), pp. 229–239.

*Primary Examiner*—Paul F. Shaver
(74) *Attorney, Agent, or Firm*—Oliff & Berridge, PLC

(57) ABSTRACT

A boron and silicon oxynitride obtained by preparing a polyborosiloxane precursor, conducting nitriding pyrolysis of the precursor to obtain an amorphous boron and silicon oxynitride, and optionally conducting additional pyrolysis to obtain a crystallized boron and silicon oxynitride. The polyborosiloxane precursor is prepared by condensation, in the presence of a catalyst, of (2) a polychlorosilane represented by the formula $R^3R^4SiCl_2$ in which the substituents $R^3$ and $R^4$ are identical or different and each represents a hydrogen atom, a chlorine atom, a linear or branched alkyl or alkenyl or alkynyl radical having 5 or less carbon atoms, or an aryl or aralkyl radical having 6 to 18 carbon atoms, with (2) an alkyl borate represented by the formula $(R^5O)_3B$ in which $R_5$ represents a linear or branched alkyl radical having 1 to 5 carbon atoms.

15 Claims, 1 Drawing Sheet

METHOD OF PREPARING SILICON AND BORON OXYNITRIDES

BACKGROUND OF THE INVENTION

1. Field of Invention

The present invention relates to a method for preparing silicon and boron oxynitrides. The present invention also relates to the silicon and boron oxynitrides obtained and the polyborosiloxanes obtained as intermediates in such a process.

2. Description of Related Art

A number of compounds are known that are refractory ceramics, for example silicon $Si_3N_4$ and silicon oxynitride. Such materials are useful for their mechanical properties at high temperatures, particularly their resistance to heat impact, to corrosion, and to oxidation. In addition, boron nitride has a low density, a high melting point, a high thermal conductivity, and chemical inertia.

These materials can be obtained in various forms, particularly in the form of fibers or films, by the organometallic method for example. However, the mechanical properties of silicon nitride fibers degrade when they are (1) subjected to a temperature higher than 1400° C. due to crystallization of $Si_3N_4$, or (2) placed in an oxidizing environment which brings about chemical transformation.

Materials of the SiBON type have been proposed. These materials combined good thermomechanical properties with exceptional oxidation resistance at high temperatures. However, these materials are either precursors of materials in which $Si_3N_4$ is the essential component and have the aforementioned drawbacks or they are obtained from precursors of the insoluble and/or nonmelting polyborosiloxane type as described, for example, by L. Venisse et al., *High Temp. Chem. Processes* 1 (1992) 129–139 and *High Temp. Chem. Processes* 1 (1992) 229–239, the disclosures of which are incorporated herein by reference. The insoluble and/or nonmelting nature of the precursors makes it difficult or even impossible to prepare boron and silicon oxynitrides in fiber form.

A known method of preparing a boron and silicon oxynitride consists of preparing a poly(borosiloxane) precursor; conducting nitriding pyrolysis of the precursor to obtain an amorphous boron and silicon oxynitride; and optionally conducting additional pyrolysis to obtain a crystallized boron and silicon oxynitride.

It is known to prepare a poly(borosiloxane) precursor by polycondensation of a boron compound comprising one or more OH groups attached to the boron and a poly (hydrogenosiloxane) that has at least one Si—H bond per monomer unit in the presence of a catalyst.

The goal of the present invention is to furnish polyborosiloxanes usable for preparing materials of the SiBON type that, in addition to the excellent thermomechanical properties of known ceramics, exhibit improved resistance to oxidation with soluble and/or melting intermediates.

SUMMARY OF THE INVENTION

The present invention is directed to a method for preparing a boron and silicon oxynitride comprising (1) a first step in which a polyborosiloxane precursor is prepared, (2) a second step in which nitriding pyrolysis of the precursor is conducted to obtain an amorphous boron and silicon oxynitride, and (3) optionally a third step in which additional pyrolysis is conducted to obtain a crystallized boron and silicon oxynitride.

The polyborosiloxane is prepared by condensation, in the presence of a catalyst, of (1) a polychlorosilane represented by the formula $R^3R^4SiCl_2$ in which substituents $R^3$ and $R^4$ are identical or different and each represents a hydrogen atom, a chlorine atom, a linear or branched alkyl or alkenyl or alkynyl radical having 5 or less carbon atoms, or an aryl or aralkyl radical having 6 to 18 carbon atoms, with (2) an alkyl borate represented by the formula $(R^5O)_3B$ in which $R^5$ represents a linear or branched alkyl radical having 1 to 5 carbon atoms.

DETAILED DESCRIPTION OF PREFERRED EMBODIMENTS

Figure 1:
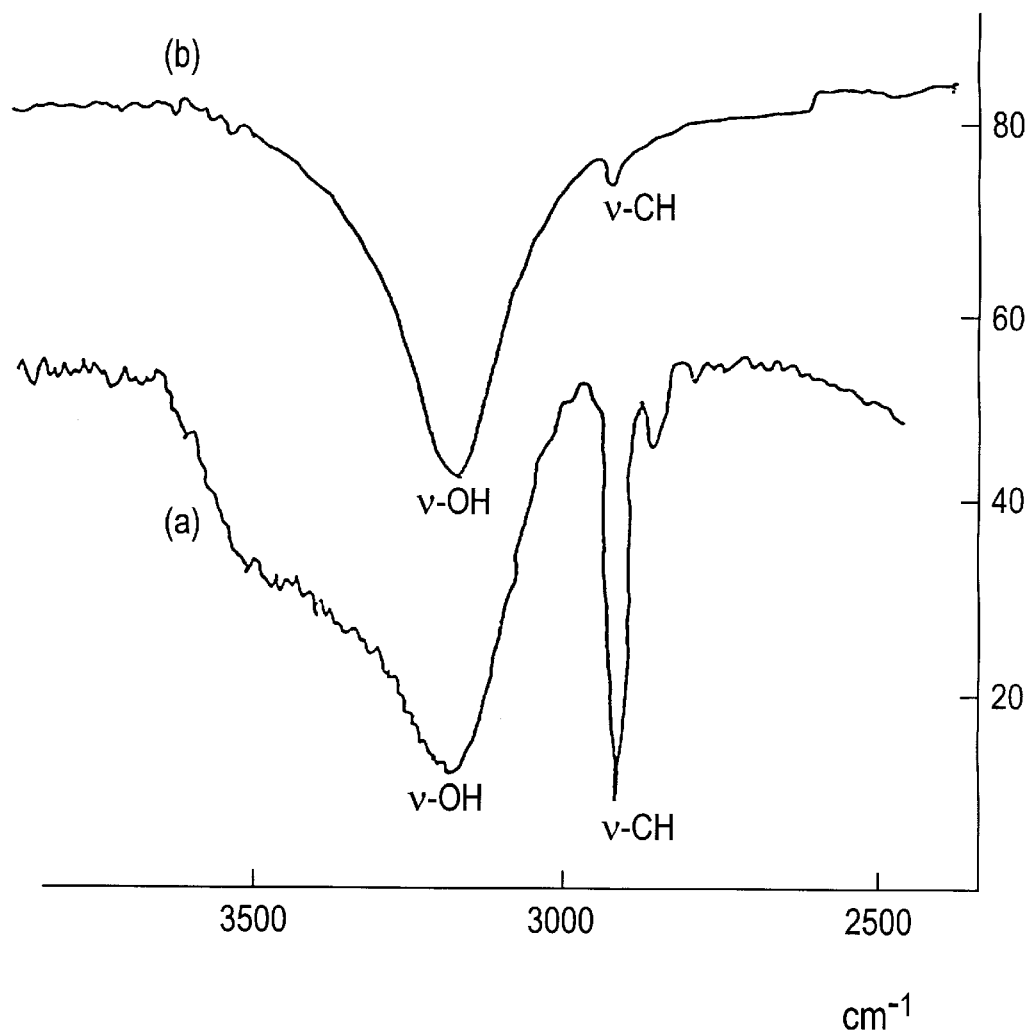
FIG. 1 represents an infrared spectrum of poly (borosiloxane) obtained by the present invention (curve a) and the infrared spectrum of a poly(borosiloxane) obtained by polycondensation of methyldichlorosilane with boric acid (curve b).

It is known that a monochlorosilane, namely triethylmonochlorosilane, can be condensed with methyl borate. However, the reactivity of the chlorine atoms of a dichlorosilane is generally significantly different from that of the chlorine atom of a monochlorosilane. For example, in the presence of basic catalysts such as dimethylcyanamide or hexamethylphosphorotriamide, $HMeSiCl_2$ dismutes into $MeSiCl_3$ and $H_2MeSiCl$ while the corresponding monochlorosilane $HMe_2SiCl$ does not react. Hence, it is not obvious to transpose the reactions known for a monochlorosilane to treatment of a polychlorosilane.

In the polychlorosilane $R^3R^4SiCl_2$, the substituents $R^3$ and $R^4$ are identical or different and each represents a hydrogen atom, a chlorine atom, a linear or branched alkyl or alkenyl or alkynyl radical having 5 or less carbon atoms, or an aryl radical or an aralkyl radical having 6 to 18 carbon atoms. In embodiments, polychlorosilanes in which $R^3$ and $R^4$ represent H, Cl, a methyl radical, or an ethyl radical are preferred.

The catalyst used for the condensation reaction of polychlorosilane with alkyl borate can be a Lewis acid (for example, $TiCl_4$ or $AlCl_3$) or a transition metal chloride (for example, $CuCl_2$, $FeCl_3$, $SnCl_2$, $CoCl_2$, or $NiCl_2$). In embodiments, $FeCl_3$ is preferred.

Alkyl borate is preferably chosen from compounds represented by $(R^5O)_3B$ in which $R^5$ represents a linear or branched alkyl radical having 1 to 5 carbon atoms such as a methyl, ethyl, propyl, isopropyl, butyl, sec-butyl, t-butyl, amyl, or isoamyl radical. Methyl borate and ethyl borate are particularly preferred.

The condensation reaction of polychlorosilane with alkyl borate is effected preferably at a temperature of between approximately 50° C. and approximately 100° C.

A poly(borosiloxane) obtained at the end of the first step in the method of the invention by condensing a polychlorosilane and alkyl borate is constituted of a network formed of ≡Si—O—B= chains represented by the formula:

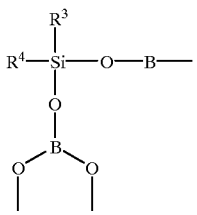

and it may contain residual =B—O—R$^5$ groups which are more stable than =B—O—H groups.

The polyborosiloxane is also characterized by its IR spectrum. In this IR spectrum, the absorption peak at approximately 3200 cm$^{-1}$ (which corresponds to v—OH) is at most equal to the absorption peak at approximately 2960 cm$^{-1}$ (which corresponds to v—CH). In contrast, the IR spectrum of a polyborosiloxane obtained by polycondensation of a polychlorosilane and boric acid has an absorption peak at approximately 3200 cm$^{-1}$ which represents at least double the absorption peak at approximately 2960 cm$^{-1}$.

In the second step of the method according to the present invention, a poly(borosiloxane) obtained in the first step is subjected to nitriding pyrolysis to form an amorphous boron and silicon oxynitride. Nitriding pyrolysis is conducted in a closed container from which oxygen is excluded under a stream of gaseous ammonia at a temperature greater than approximately 1000° C. In embodiments, a temperature lower than approximately 1300° C. is particularly preferred. The temperature rise rate is preferably between 0.5° C. min and 50° C./min.

The boron and silicon oxynitrides obtained after nitriding pyrolysis are essentially amorphous solid materials that can be represented by the following formula: $SiB_yN_{y+x/3}O_{2-x/3}$, with $0.1 \leq x \leq 1.3$ and $0.01 \leq y \leq 2$.

After additional pyrolysis at 1600° C. in a neutral atmosphere (under nitrogen for example), a partially crystallized solid is obtained in which the $Si_2N_2O$, the BN phase, and the $Si_3N_4$ phase can be identified, and which can be represented by the following formula: $(Si_2N_2O)_m(BN)_n(Si_3N_4)_p$, with $0 \leq m \leq 0.5$, $0 \leq n \leq 0.3$, and $0 \leq p \leq 0.5$. The three phases are not necessarily present simultaneously. Their relative proportions vary for example with the Si/B ratio in the poly(borosiloxane) precursor.

The present invention is illustrated by the following examples which are not limiting in nature. Examples 1–8 illustrate preparation of a poly(borosiloxane) by polycondensation of a polychlorosilane and an alkyl borate. The yield indicated in the examples represents: (weight of product obtained) ×100/(theoretical weight corresponding to quantitative elimination of alkyl chloride).

EXAMPLES

Example 1

Methyldichlorosilane (10 g, 86.9 mmol), methyl borate (6 g, 57.6 mmol), and ferric chloride predried on thionyl chloride (0.1 g, 0.6 mmol) are introduced successively under a dry argon atmosphere into a 100 mL flask fitted with a magnetic agitator and surmounted by a rising cooler cooled to 0° C., connected to a $CaCl_2$ column.

The mixture is heated at 80° C. for 6 hours until the expected quantity of methyl chloride is released. During the reaction, a solid is observed to appear. After cooling, the product is filtered under a dry atmosphere then devolatalized in a vacuum at room temperature for 3 hours. A poly (borosiloxane) in the form of a congealed grease is obtained (6.2 g, yield: 87%) and is characterized by IR and NMR.

The poly(borosiloxane) thus obtained is crosslinked by heating at a temperature greater than 100° C. It is soluble in THF and, to a lesser degree, in toluene. Due to its solubility in THF, it can be made into the form of fibers, films, or matrices.

The mean number-average molecular weight MP and the polymolecularity index $I_p$ were found by steric exclusion chromatography (SEC) as follows:

$34000 < \overline{M_p} < 37000$ and $2.2 < I_p < 3$

Thermogravimetric analysis indicates a weight loss of 5% at 180° C. with the product starting to lose weight at 480° C. leading to a residue percentage of 82%. Microanalysis gave the following results:

|   | Found | Calculated |
|---|---|---|
| C | 13.04 | 14.40 |
| H | 4.93 | 4.80 |
| B | 10.01 | 8.64 |

FIG. 1 represents the infrared spectrum or poly (borosiloxane) obtained according to Example 1 (curve a) and the infrared spectrum of a poly(borosiloxane) of the prior art obtained by polycondensation of methyldichlorosilane with boric acid (curve b). The vertical axis is the wave number v and the horizontal axis is the absorption A expressed in arbitrary units. For the poly(borosiloxane) of the present invention, the absorption peak at approximately 3200 cm$^{-1}$ (which corresponds to v—OH) is slightly less than the absorption peak at approximately 2960 cm$^{-1}$ (which corresponds to v—CH). For the poly(borosiloxane) of the prior art, the absorption peak at approximately 3200 cm$^{-1}$ (which corresponds to v—OH) is far higher than the absorption peak at approximately 2960 cm$^{-1}$ (which corresponds to v-CH).

Example 2

The method of Example 1 is reproduced with $HMeSiCl_2$ replaced by $Me_2SiCl_2$ (6.5 g, 51 mmol). A poly (borosiloxane) is isolated (4.36 g, yield: 90%) with a TGA residue percentage of 41% is isolated. The poly (borosiloxane), soluble in THF, can be filtered. Microanalysis gave the following results:

|   | Found | Calculated |
|---|---|---|
| C | 21.21 | 24.69 |
| H | 5.55 | 6.17 |
| B | 8.99 | 7.41 |

Example 3

The method of Example 1 is reproduced, replacing $HMeSiCl_2$ mole for mole with $MeViSiCl_2$. A poly (borosiloxane) with a yield of 75% and a TGA residue percentage of 48.5% is isolated. Vi represents vinyl.

Example 4

The method of Example 3 is reproduced, replacing MeViSiCl$_2$ mole for mole with $\phi_2SiCl_2$. A poly (diphenylborosiloxane) with a yield of 90%, with a melting point of 259° C. and a TGA residue percentage of 90%, is isolated.

Example 5–6

The method of Example 1 is reproduced, using MeSiCl$_3$ and SiCl$_4$, respectively. Methyl chloride characteristic of poly(borosiloxane) is released.

Example 7

The method of Example 1 is reproduced with the methyl borate being replaced mole for mole by isopropyl borate. A poly(borosiloxane) with a yield of 87% and a TGA residue percentage of 76% is isolated.

Example 8

The poly(borosiloxane) obtained in Example 1 by condensation between methyl borate and methyldichlorosilane is subjected to heat treatment under a stream of ammonia.

The heating rate is 3° C./min. Several tests are made raising the samples to various temperatures and holding them at these temperatures for 5 hours. Two tests are also conducted with the temperature held for 3 days.

The table below shows the results of the chemical analysis and provides the ceramic yield.

| Temp (° C.) | 200 | 400 | 600 | 600/3d | 1000 | 1300 | 1300/3d |
|---|---|---|---|---|---|---|---|
| % N | 14.4 | 14.9 | 12.5 | 13.6 | 12.9 | 12.6 | 13.5 |
| % O | 38.2 | 35.4 | 39.2 | 41.9 | 39.4 | 40.9 | 37.3 |
| % B |  |  |  |  | 11.4 | 10.7 |  |
| % Si |  |  |  |  | 33.3 | 33.6 |  |
| % C |  |  |  |  | 0.5 |  |  |
| Yield (%) | 98 | 90 | 87 |  | 82 | 82 | 82 |

Nitrogen is introduced into the polymer starting at the lowest temperatures. In terms of chemical composition, a formulation of the SiB$_{0.8}$N$_{0.8}$O$_2$ type is obtained at 1000° C.

The products are analyzed by x-ray diffraction and infrared spectroscopy.

With x-ray diffraction, signals of the boron nitride type (2θ=42°) and amorphous silica (2θ=22°) are observed. Crystallization of hexagonal boron nitride is visible for the compound nitrided at 1300° C. (θ=25.6°). With infrared spectroscopy, vibration bands B—O (1470 and 1400 cm$^{-1}$); B—OH (1200, 650, and 550 cm$^{-1}$); Si—CH$_3$ (1265 and 770 cm$^{-1}$); Si—O (1110, 1045, and 805 cm$^{-1}$) are observed in the precursor poly(borosiloxane). Other bands at 1625, 1560; 890 (Si—O—B), 840 cm$^{-1}$ are observed.

At 200° C., the B—OH bands disappears. The stretching bands Si—O and B—O are displaced toward low frequencies. At 600° C., the Si—CH$_3$ bands decrease and B-N bands form (1390 and 770 cm$^{-1}$). The Si—O stretching band is at 1045 cm$^{-1}$ and Si—O deformation appears at 450 cm$^{-1}$. At 1000° C., the Si—CH$_3$ bands disappears and the B—N band became more intense; the Si—O band appears at 1085 cm$^{-1}$.

What is claimed is:

1. A method for preparing a boron and silicon oxynitride comprising:
   preparing a polyborosiloxane precursor, and
   conducting nitriding pyrolysis of the precursor to obtain an amorphous boron and silicon oxynitride,
   wherein said polyborosiloxane is prepared by condensing, in the presence of a catalyst,
   a polychlorosilane represented by the formula R$^3$R$^4$SiCl$_2$ in which the substituents R$^3$ and R$^4$ are identical or different and each represents a hydrogen atom, a chlorine atom, a linear or branched alkyl or alkenyl or alkynyl radical having 5 or less carbon atoms, or an aryl or aralkyl radical having 6 to 18 carbon atoms, with
   an alkyl borate represented by the formula (R$^5$O)$_3$B in which R$^5$ represents a linear or branched alkyl radical having 1 to 5 carbon atoms.

2. The method according to claim 1, wherein the catalyst is a Lewis acid or a transition metal chloride.

3. The method according to claim 2, wherein said Lewis acid is TiCl$_4$ or AlCl$_3$.

4. The method according to claim 2, wherein said metal chloride is selected from the group consisting of CuCl$_2$, FeCl$_3$, SnCl$_2$, CoCl$_3$ and NiCl$_2$.

5. The method according to claim 1, wherein said alkyl borate is methyl borate or ethyl borate.

6. The poly(borosiloxane) obtained as an intermediate by the method according to claim 1.

7. The poly(borosiloxane) according to claim 6, wherein said poly(borosiloxane) comprises a soluble, meltable network formed of ≡Si—O—B= chains represented by the formula:

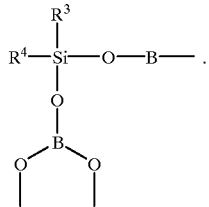

8. The poly(borosiloxane) according to claim 7, further comprising =B—O—R$^5$ groups.

9. The poly(borosiloxane) according to claim 7, wherein said poly(borosiloxane) has an infrared spectrum with an absorption peak at approximately 3200 cm$^{-1}$ which is at most equal to the absorption peak at approximately 2960 cm$^{-1}$.

10. Boron and silicon oxynitride obtained by a method according to claim 1.

11. The boron and silicon oxynitrides according to claim 10 represented by the following formula:

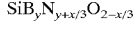

wherein 0.1≦x≦1.3 and 0.01≦y≦2.

12. The boron and silicon oxynitrides according to claim 10 represented by the following formula:

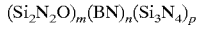

wherein 0≦m≦0.5, 0≦n ≦0.3 and 0≦p≦0.5.

13. The method according to claim 1, further comprising conducting additional pyrolysis of the amorphous boron and silicon oxynitride to obtain a crystallized boron and silicon oxynitride.

14. The poly(borosiloxane) obtained as an intermediate by the method according to claim 13.

15. Boron and silicon oxynitride obtained by the method according to claim 13.

* * * * *